US009979001B2

(12) United States Patent
Wan et al.

(10) Patent No.: US 9,979,001 B2
(45) Date of Patent: May 22, 2018

(54) BATTERY EXPLOSION-PROOF DEVICE AND BATTERY PACK COMPRISING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Hu Wan, Guangdong (CN); Zhiwei Tong, Guangdong (CN); Qing Lai, Guangdong (CN); Jianhua Zhu, Guangdong (CN)

(73) Assignees: SHENZHEN BYD AUTO R&D COMPANY LIMITED, Shenzhen, Guangdong (CN); BYD COMPANY LIMITED, Shenzhen, Guangdong (CN)

(*) Notice: Subject to any disclaimer, the term of this patent is extended or adjusted under 35 U.S.C. 154(b) by 995 days.

(21) Appl. No.: 14/254,799

(22) Filed: Apr. 16, 2014

(65) Prior Publication Data
US 2014/0227565 A1  Aug. 14, 2014

Related U.S. Application Data

(63) Continuation of application No. PCT/CN2012/082807, filed on Oct. 11, 2012.

(30) Foreign Application Priority Data

Oct. 28, 2011  (CN) .................... 2011 2 0418896 U (51) Int. Cl.
*H01M 2/12*  (2006.01)

(52) U.S. Cl.
CPC ....... *H01M 2/1241* (2013.01); *H01M 2/1205* (2013.01); *H01M 2/12* (2013.01);
(Continued)

(58) Field of Classification Search
CPC .... H01M 2/12; H01M 2/1205; H01M 2/1211; H01M 2/1217; H01M 2/1223; H01M 2/1229; H01M 2/1235; H01M 2/1241
See application file for complete search history.

(56) References Cited

U.S. PATENT DOCUMENTS

| 4,002,495 A | * | 1/1977 | Hakarine | ................ F16K 24/06 |
| | | | | 429/87 |
| 5,521,024 A | * | 5/1996 | Sasaki | ..................... H01M 2/12 |
| | | | | 429/130 |
| 5,981,099 A | * | 11/1999 | Bourbeau | ........... H01M 2/1205 |
| | | | | 429/53 |

(Continued)

FOREIGN PATENT DOCUMENTS

| CN | 201408795 Y | | 2/2010 |
| CN | 101901886 | * | 12/2010 |

(Continued)

OTHER PUBLICATIONS

PCT International Search Report dated Jan. 24, 2013, issued in International Application No. PCT/CN2012/082807 (4 pages).

*Primary Examiner* — Ula C Ruddock
*Assistant Examiner* — Matthew W Van Oudenaren
(74) *Attorney, Agent, or Firm* — Finnegan, Henderson, Farabow, Garrett & Dunner LLP (57) ABSTRACT

A battery explosion-proof device battery explosion-proof device includes a valve body, a rupture plate, and a protecting cover. The valve body includes a base portion and a shaft portion connected with the base portion. The shaft portion may be formed with threads on an external circumferential surface thereof and with a venting passage. The rupture plate may be disposed inside a concaved portion of the base portion for sealing the venting passage. The protecting cover covers the concaved portion.

17 Claims, 4 Drawing Sheets

(52) U.S. Cl.
 CPC ........ *H01M 2/1211* (2013.01); *H01M 2/1217* (2013.01); *H01M 2/1223* (2013.01); *H01M 2/1229* (2013.01); *H01M 2/1235* (2013.01)

(56) References Cited

U.S. PATENT DOCUMENTS

| | | | |
|---|---|---|---|
| 6,562,517 B1* | 5/2003 | Misra | H01M 2/1205 429/225 |
| 2009/0197153 A1* | 8/2009 | Fujikawa | H01M 2/1055 429/82 |
| 2010/0032039 A1* | 2/2010 | Nemoto | H01M 2/1229 137/843 |
| 2010/0233520 A1* | 9/2010 | Suzuki | H01M 2/0277 429/56 |

FOREIGN PATENT DOCUMENTS

| | | |
|---|---|---|
| CN | 101901886 A | 12/2010 |
| CN | 201910452 U | 7/2011 |
| CN | 202308124 U | 7/2012 |
| EP | 0040311 A1 | 11/1981 |
| EP | 2299520 A1 | 3/2011 |
| JP | H 11-144696 A | 5/1999 |
| JP | 2008-198664 A | 8/2008 |
| JP | 2009-205991 A | 9/2009 |
| KR | 10-2005-0007921 A | 1/2005 |
| KR | 10-2008-0003784 A | 1/2008 |
| KR | 10-2009-0089292 A | 8/2009 |
| KR | 10-2010-0081942 A | 7/2010 |
| WO | WO 2013/060239 A1 | 5/2013 |

\* cited by examiner

BATTERY EXPLOSION-PROOF DEVICE AND BATTERY PACK COMPRISING THE SAME

CROSS-REFERENCE TO RELATED APPLICATION

This application is a continuation of International Application No PCT/CN2012/082807, filed on Oct. 11, 2012, which claims priority to and benefits of Chinese Patent Application No. 201120418896.7, filed with the State Intellectual Property Office of the People's Republic of China (SIPO) on Oct. 28, 2011. The entire contents of the above-referenced applications are hereby incorporated by reference.

FIELD

Embodiments of the present disclosure generally relate to the field of power battery, more particularly, to a battery explosion-proof device and a battery pack comprising the same.

BACKGROUND

Excellent rate performance and outstanding safety performance are factors which are considered in vehicle-mounted power batteries. Conventionally, a battery pack consists of at least one single battery. Therefore, the safety performance of every single battery should be considered in order to improve safety performance of the battery pack. On special occasions, the safety performance of every single battery will be deteriorated due to the low safety performance of the battery pack.

Battery explosion prevention is the primary mission for improving battery safety performance in extreme conditions. Generally, an explosion-proof structure may be fixed in the battery to prevent the battery from explosion. Since battery pack is always designed with a leak-proof structure, if one single battery in the battery pack becomes abnormal and produces large amounts of gas, the environment in which other single batteries located will also be changed, which may affect the normal work of other single battery or battery pack. Thus, to ensure battery safety, not only should the safety performance of every single battery be improved, but also an explosion-proof device may be applied in the battery pack.

However, because of the large volume and irregular shape of the power battery pack, it may be difficult to install an explosion-proof device, such as an explosion-proof valve, in the power battery pack.

Besides, to avoid battery explosion, an arcual, such as an L-shaped, cross-shaped or linear-shaped, dent may be carved on a battery shell. However, it may be difficult to operate under a low pressure in this manner. Moreover, an actuating pressure of the explosion-proof device may fluctuate in a large range, an exhaust area thereof may be small, and the gas emission may be non-uniform, which may not meet pressure releasing requirements for the power battery.

SUMMARY

In view thereof, the present disclosure seeks to solve at least one of the problems in the art. A battery explosion-proof device may be provided, which may have an improved pressure accuracy with flexible alternative installing position.

Further, a battery pack comprising the same is also provided.

According to an embodiment of the present disclosure, a battery explosion-proof device may be provided. The battery explosion-proof device may comprise a valve body including a base portion formed with a concaved portion and a shaft portion connected with the base portion which is formed with threads on an external circumferential surface thereof, the shaft portion being formed with a venting passage which is communicated with the concaved portion; a rupture plate which is disposed inside the concaved portion for sealing the venting passage; and a protecting cover configured to cover the concaved portion. According to embodiments of a first broad aspect of the present disclosure, a battery explosion-proof device is provided, which solves the technical problems existing in the prior art of low-accuracy and inflexible mounting portion in explosion-proof structure of power battery. The present disclosure has provided a battery explosion-proof device having high-accuracy and flexible mounting portion.

According to an embodiment of the present disclosure, a battery pack may be provided. The battery pack may comprise: a lower shell; at least a battery module accommodated in the lower shell; and an upper shell mated with the lower shell for sealing, further the upper shell is formed with an installing hole where the battery explosion-proof device according to any one of the present disclosure is connected therein. With the battery explosion-proof device of the present disclosure, the battery pack may have an improved performance in preventing battery explosion, and the pressure accuracy thereof may be improved. Moreover, the battery explosion-proof device may be disposed at alternative places on the shell of the battery pack as the condition may require which may simplify the assembly/disassembly procedure of the battery pack.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference the accompanying drawings, in which.

DETAILED DESCRIPTION

Reference will be made in detail to embodiments of the present disclosure. The embodiments described herein with reference to accompanying drawings are explanatory, illustrative, which are used to generally understand the present disclosure. The embodiments shall not be construed to limit the present disclosure. The same or similar elements and the elements having same or similar functions are denoted by like reference numerals throughout the descriptions.

In the following the battery explosion-proof device according to embodiments of the present disclosure will be described in detail with reference to FIGS. 1-8 below.

Figure 1:
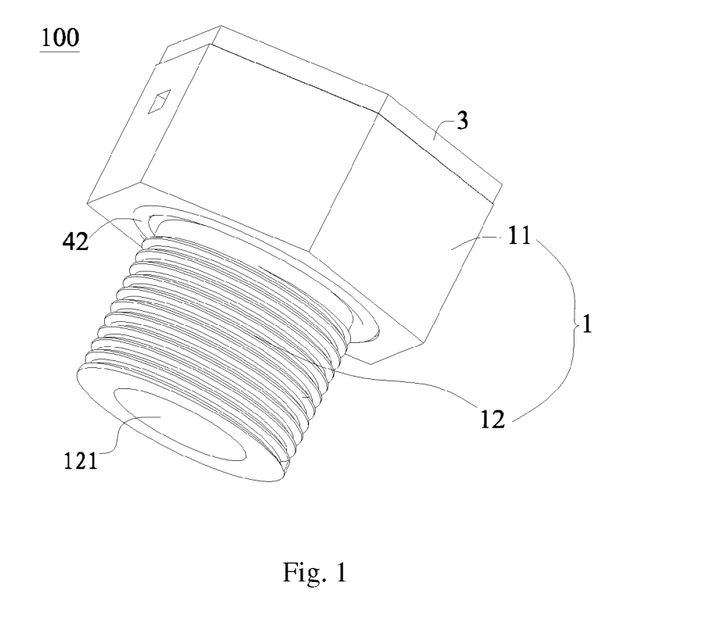
FIG. 1 is a bottom right perspective view of a battery explosion-proof device according to an embodiment of the present disclosure.

As shown in FIGS. 1-5, the battery explosion-proof device 100 may comprise a valve body 1, a rupture plate 2, and a protecting cover 3. The valve body 1 may comprise a base portion 11 including a concaved portion 111, and a shaft portion 12 connected with the base portion 11. As shown in FIG. 1, the shaft portion 12 may be formed with threads on an external circumferential surface thereof and with a venting passage 121, which may be in communication with the concaved portion 111. In one embodiment, the rupture plate 2 may be disposed inside the concaved portion 111 for sealing the venting passage 121. The protecting cover 3 may be configured to cover the concaved portion 111. In one embodiment, the base portion 11 may be integrally formed with the shaft portion 12.

To help improve the sealing property of the explosion-proof device 100 with, for example, a mating surface of, such as, a shell of the battery pack, a seal ring 4 may be provided. As shown in FIG. 1, an annular groove 42 around the shaft portion 12 may be formed at a surface 116 of the base portion 11 where the base portion 11 is connected with the shaft portion 12. The seal ring 4 may be installed in the annular groove 42. The seal ring 4 may have a diameter larger than an outer diameter of the shaft portion 12 and smaller than the diameter of the bottom surface of the base portion 11 where the base portion 11 is connected with the shaft portion 12. In one embodiment, the seal ring 4 may be made of any known rubber with good elasticity performance, fire-proof behavior and weathering resistance. Thus, when the battery explosion-proof device is used, the seal ring 4 may prevent water from seeping inside the battery pack so that the battery safety may be enhanced.

Figure 2:
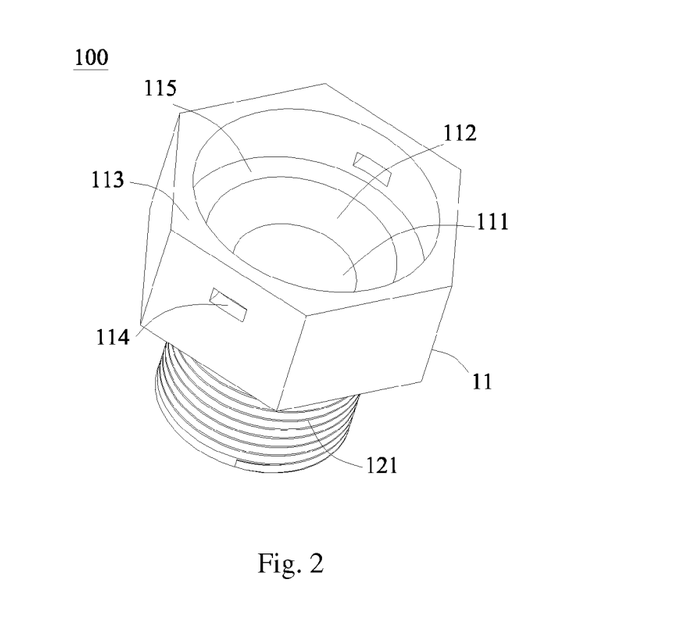
FIG. 2 is a top right perspective view of a valve body in a battery explosion-proof device according to an embodiment of the present disclosure.

In one embodiment, the base portion 11 may be formed with a mounting surface 112 where the rupture plate 2 may be disposed, and a side wall 113 formed with a second opening 114. In one embodiment, the base portion 11 may be integrally formed with the shaft portion 12 via, for example, injection molding. Thus, the mounting surface 112 and the side wall 113 may be integrally formed into the concaved portion 111. In one embodiment, the mounting surface 115 may be formed into a ring surface so that it may be convenient to assemble or replace the rupture plate 2.

In one embodiment, a circumferential surface of the venting passage 121 may penetrate through the mounting surface 115 to be in communication with the concaved portion 111. In one embodiment, a circumferential surface of the venting passage 121 may be connected with the mounting surface 115 via a transition surface 117, and an inner diameter of the mounting surface 115 may be larger than an inner diameter of the venting passage 121.

In one embodiment, the rupture plate 2 may be welded at the mounting surface 115 via, for example, electron beam welding, laser welding, etc. In one embodiment, the rupture plate 2 is welded at the mounting portion 112 via laser welding. The mounting surface 115 may be surrounded by the side wall 113.

Figure 3:
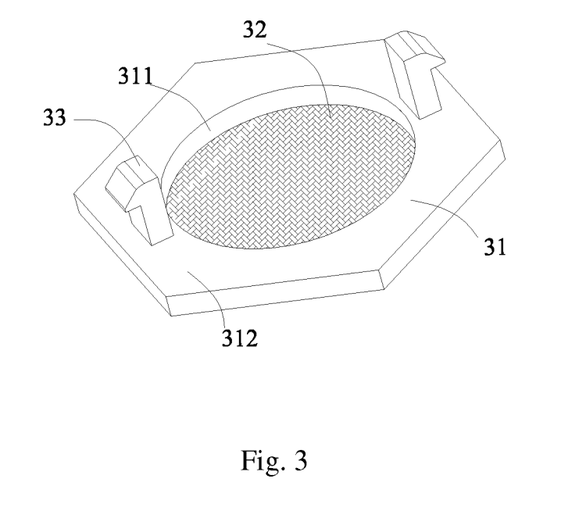
FIG. 3 is a schematic perspective view of a protecting cover in a battery explosion-proof device according to an embodiment of the present disclosure.

In the following, the protecting cover 3 will be described in detail. As shown in FIG. 3, the protecting cover may comprise a seal plate 31 formed with a central hole 311, a net portion 32 covering the central hole 311, and a suspension clip portion 33 formed on a surface 312 of the seal plate 31 facing the concaved portion 111. The suspension clip portion 33 may be clipped with the second opening 114 to connect the protecting cover 3 with the side wall 113 of the base portion 11. In one embodiment, the protecting cover 3 may be integrally formed via injection molding. A metal net portion may be embedded and molded into the seal plate 31 to cover the central hole 312, thus forming the net portion 32. The area size of the net portion 32 may have a dimension adapted to a desired maximal exhausting velocity of the battery pack 200. The clip portion 33 on the protecting cover plate 3 may cooperate with the second opening 114 on the side wall 113 to fit the protecting cover 3 and the base portion 11 together.

Figure 4:
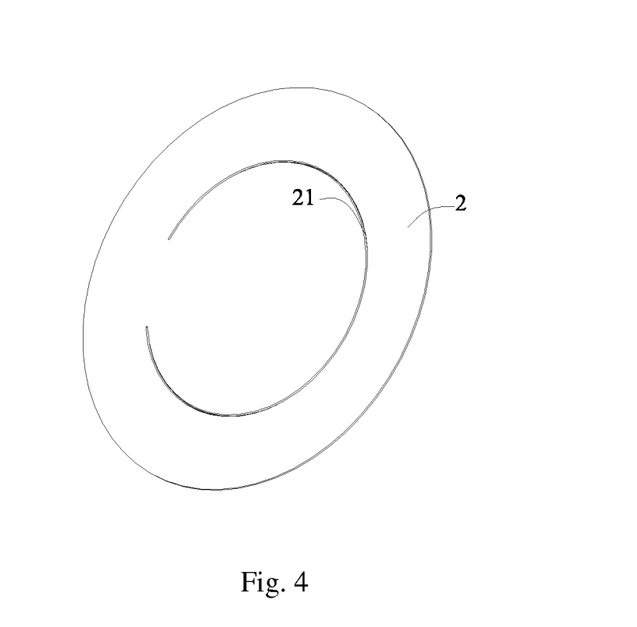
FIG. 4 is a schematic view of a rupture plate in a battery explosion-proof device according to an embodiment of the present disclosure.
Figure 5:
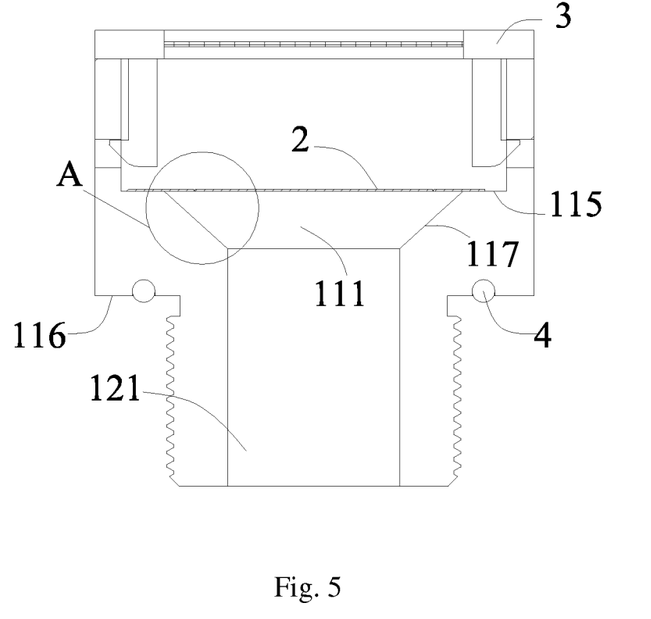
FIG. 5 is a cross-sectional view of a battery explosion-proof device according to an embodiment of the present disclosure.
Figure 6:
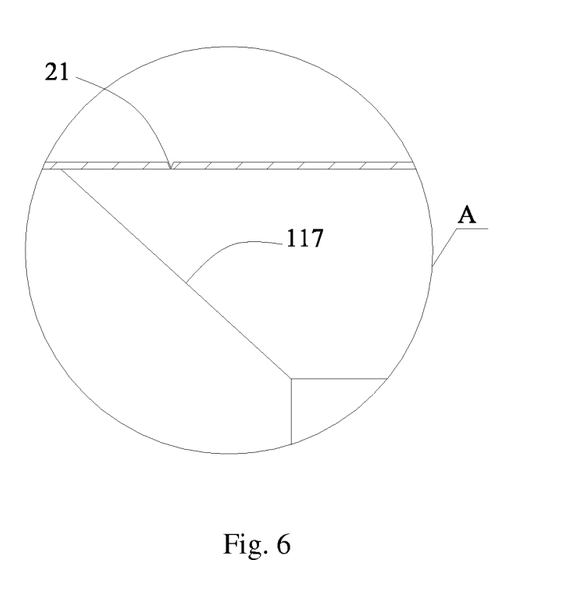
FIG. 6 is an enlarged schematic view of a section A shown in FIG. 5.

In the following, the rupture plate 2 will be described in detail with reference to FIGS. 4-6. In one embodiment, the rupture plate 2 may be formed with a dent 21, such as an arcual dent, which may have a diameter larger than the inner diameter of the venting passage 121 and smaller than an external diameter of the mounting surface 115. Thus, when a battery is exploded inside the battery pack 200, the inner pressure can be rapidly released via the compelled opening of the arcual dent. Because the diameter of arcual dent 21 is larger than the inner diameter of the venting passage 121, the rupture plate can be prevented from dropping into the battery pack 200 after explosion. Also, because the diameter of the arcual dent 21 is smaller than the external diameter of the mounting surface 115, the range of bursting pressure of the rupture plate 2 may be ensured.

In one embodiment, the rupture plate 2 may be made of a metal plate with a specially designed dent. The rupture plate 2 may be made of any known material, for example, steel, nickel, copper, aluminum material, etc. In one embodiment, the rupture plate 2 may be made of the same material as the base portion 11, for example, stainless steel.

The dent 21 on the rupture plate 2 can be designed into different shapes, for example, circle, tetragon, U-shaped, ellipse, elliptical arc, etc. In one embodiment, the dent 21 on the rupture plate 2 may have a circular arc shape. The dent 21 on the rupture plate 2 can be carved through any direction, for example, the arcual dent 21 can be carved from one or more direction. In one embodiment, the dent 21 may be carved through only in one direction.

In one embodiment, the cross section of arcual dent 21 could be designed into different shapes, for example, trapezoidal, reversed triangular, rectangular, arcual, or circular.

The rupture plate 2 accommodated inside the concaved portion 111 may be designed into any shapes that may be adapted to the operation of the rupture plate 2. Thus, the rupture plate 2 may be either convex or concave. In the embodiments of the present disclosure, the rupture plate 2 may have a flat shape.

Figure 7:
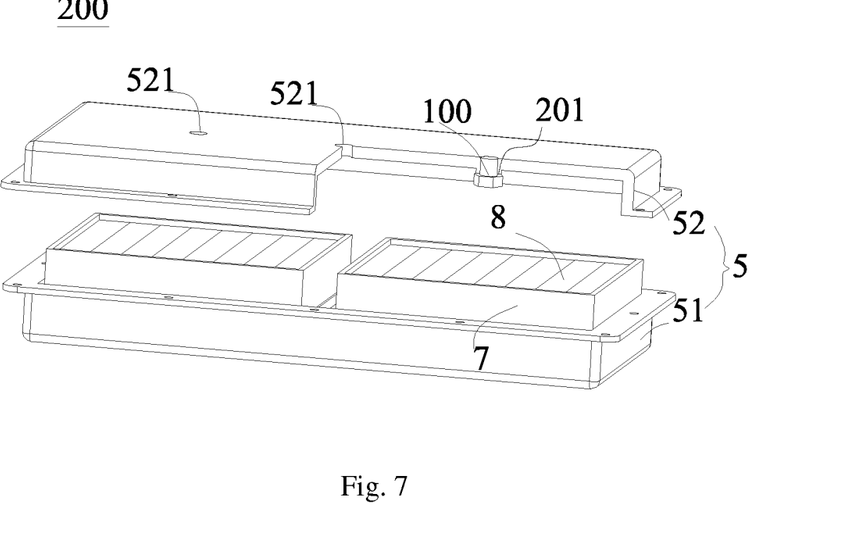
FIG. 7 is an exploded perspective view of a battery pack according to an embodiment of the present disclosure.

As shown in FIG. 7, a battery pack 200 according to embodiments of the present disclosure will be described in detail in the following. The battery pack 200 may comprise: a lower shell 51; at least one battery module 7 accommodated in the lower shell 51; and an upper shell 52 mated with the lower shell 51 for sealing. In one embodiment, at least the upper shell 52 may be formed with an installing hole 521 where the battery explosion-proof device 100 as described above may be connected. In one embodiment, the battery module 7 may comprise a plurality of batteries 8. The sealing performance of the battery pack 200 may be further enhanced by the sealing ring 4 which is provided between the annular groove 42 and a surface 201 on the upper shell 52.

During assembly, if a thickness of the upper shell 52 is large enough compared with a height of the battery explosion-proof device 100, threads may be formed inside the installing hole 521 so that the shaft portion 12 of the battery explosion-proof device 6 may be threadedly connected with the installing hole 521 of the upper shell 52.

Figure 8:
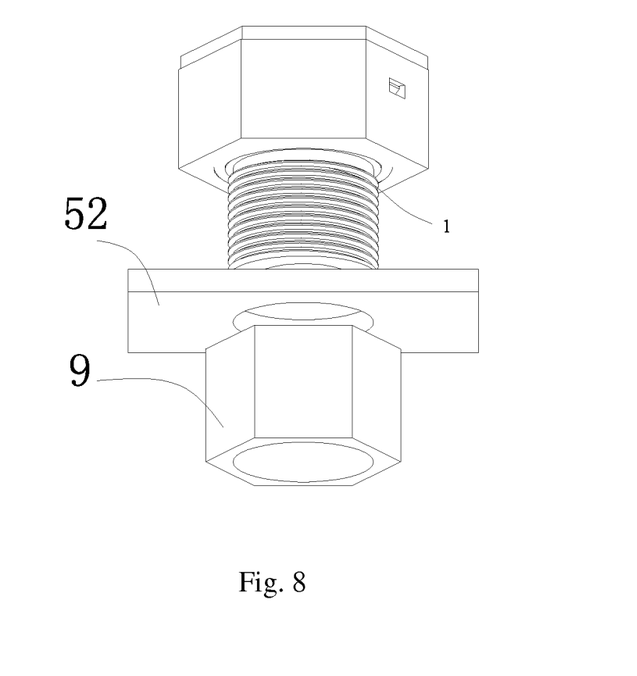
FIG. 8 is a schematic mounting view of a battery explosion-proof device according to an embodiment of the present disclosure.

If the thickness of the upper shell 52 is relatively small compared with the height of the battery explosion-proof device 100, a mating nut 9 may be provided additionally so that the shaft portion 12 may penetrate through the installing hole 521 and tightened with the upper shell 52 via the mating nut 9. As shown in FIG. 8, in one embodiment, the battery explosion-proof device 100 may be connected with the lower shell 51 via the mating nut 9.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A battery explosion-proof device, comprising:
   a valve body including:
      a base portion having an opening; and
      a shaft portion connected with the base portion, wherein the shaft portion includes threads on an external circumferential surface thereof, and the valve body includes a venting passage in communication with the opening;
   a rupture plate disposed inside the opening for sealing the venting passage; and
   a protecting cover configured to cover the opening, the protecting cover comprising
      a seal plate formed with a central hole;
      a net portion covering the central hole; and
      a suspension clip portion formed on a surface of the seal plate facing the opening;
   wherein the base portion is formed with a second opening at a side wall thereof to be buckled with the suspension clip portion.

2. The battery explosion-proof device of claim 1, wherein the opening includes a concave portion.

3. The battery explosion-proof device of claim 2, wherein an annular groove around the shaft portion is formed at a surface of the base portion where the base portion is connected with the shaft portion.

4. The battery explosion-proof device of claim 1, wherein the base portion is formed with a mounting surface where the rupture plate is disposed, and the venting passage penetrates through the mounting surface to be in communication with the opening.

5. The battery explosion-proof device of claim 4, wherein the rupture plate is welded to the mounting surface.

6. The battery explosion-proof device of claim 5, wherein a circumferential surface of the venting passage is connected with the mounting surface via a transition surface.

7. The battery explosion-proof device of claim 6, wherein the rupture plate is formed with an arcual dent which has a diameter larger than an inner diameter of the venting passage and smaller than an external diameter of the transition surface.

8. The battery explosion-proof device of claim 1, wherein the rupture plate is made of steel, nickel, copper, aluminum material, or stainless steel.

9. The battery explosion-proof device of claim 7, wherein the arcual dent has a trapezoidal, reversed triangular, rectangular, arcual, or circular cross section.

10. The battery explosion-proof device of claim 5, wherein the rupture plate is welded at the mounting surface via electron beam welding or laser welding.

11. A battery pack, comprising:
    a lower shell;
    at least one battery module accommodated in the lower shell; and
    an upper shell mated with the lower shell for sealing the battery pack, wherein at least the upper shell includes a battery explosion-proof device, which includes:
       a valve body including:
          a base portion having an opening; and
          a shaft portion connected with the base portion, wherein the shaft portion includes threads on an external circumferential surface thereof, and the valve body includes a venting passage in communication with the opening;
       a rupture plate disposed inside the opening for sealing the venting passage; and
       a protecting cover configured to cover the opening, the protecting cover comprising
          a seal plate formed with a central hole;
          a net portion covering the central hole; and
          a suspension clip portion formed on a surface of the seal plate facing the opening;
       wherein the base portion is formed with a second opening at a side wall thereof to be buckled with the suspension clip portion.

12. The battery pack of claim 11, wherein the shaft portion is threadedly connected with the upper shell.

13. The battery pack of claim 11, wherein the shaft portion penetrates through an installing hole on the upper shell and the shaft portion is tightened with the upper shell via a mating nut.

14. The battery pack of claim 11, wherein the opening includes a concave portion.

15. The battery pack of claim 11, wherein an annular groove around the shaft portion is formed at a surface of the base portion where the base portion is connected with the shaft portion.

16. The battery pack of claim 11, wherein the protecting cover comprises:
    a seal plate formed with a central hole;
    a net portion covering the central hole; and
    a suspension clip portion formed on a surface of the seal plate facing the opening.

17. A battery explosion-proof device, comprising:
    a valve body including:
       a base portion having an opening; and
       a shaft portion connected with the base portion, wherein the shaft portion includes threads on an external circumferential surface thereof, and the valve body includes a venting passage in communication with the opening;

a rupture plate disposed inside the opening for sealing the venting passage and formed with an arcual dent which has a diameter larger than an inner diameter of the venting passage; and a protecting cover configured to cover the opening.

* * * * *

UNITED STATES PATENT AND TRADEMARK OFFICE
CERTIFICATE OF CORRECTION

PATENT NO. : 9,979,001 B2
APPLICATION NO. : 14/254799
DATED : May 22, 2018
INVENTOR(S) : Wan et al.

Page 1 of 1

It is certified that error appears in the above-identified patent and that said Letters Patent is hereby corrected as shown below:

On the Title Page

Item (72), in the Inventors, Lines 1-4:
"Hu Wan, Guangdong (CN); Zhiwei Tong, Guangdong (CN); Qing Lai, Guangdong (CN); Jianhua Zhu, Guangdong (CN)"
Should read:
--Hu Wan, Shenzhen (CN); Zhiwei Tong, Shenzhen (CN); Qing Lai, Shenzhen (CN); Jianhua Zhu, Shenzhen (CN)--.

Item (30), in the Foreign Application Priority Data, Line 2:
"Oct. 28, 2011 (CN) ........ 2011 2 0418896 U"
Should read:
--Oct. 28, 2011 (CN) ....... 2011 2 0418896.7--.

Signed and Sealed this
Twenty-first Day of August, 2018

Andrei Iancu
*Director of the United States Patent and Trademark Office*